US00RE51013E

(19) United States
(12) Reissued Patent
Gillan

(10) Patent Number: US RE51,013 E
(45) Date of Reissued Patent: Aug. 25, 2026

(54) AUTOMATIC STEERING INSTRUCTIONS FOR DIRECTIONAL MOTOR DRILLING

(71) Applicant: Nabors Drilling Technologies USA, Inc., Houston, TX (US)

(72) Inventor: Colin J. Gillan, Houston, TX (US)

(73) Assignee: Nabors Drilling Technologies USA, Inc., Houston, TX (US)

(21) Appl. No.: 18/510,313

(22) Filed: Nov. 15, 2023

Related U.S. Patent Documents

Reissue of:
(64) Patent No.: 11,174,718
Issued: Nov. 16, 2021
Appl. No.: 15/789,706
Filed: Oct. 20, 2017

(51) Int. Cl.
*E21B 44/00* (2006.01)
*E21B 7/06* (2006.01)
*E21B 47/024* (2006.01)

(52) U.S. Cl.
CPC ..... *E21B 44/005* (2013.01); *E21B 7/067* (2013.01); *E21B 47/024* (2013.01)

(58) Field of Classification Search
CPC ..... E21B 44/005; E21B 7/067; E21B 47/024
See application file for complete search history.

(56) References Cited

U.S. PATENT DOCUMENTS 8,210,283 B1 7/2012 Benson
8,301,382 B2 * 10/2012 Herrera ..... E21B 44/00 702/11
9,865,022 B2 1/2018 Benson
10,208,580 B2 2/2019 Benson
10,726,506 B2 7/2020 Benson
11,170,454 B2 11/2021 Benson
2003/0024738 A1 * 2/2003 Schuh ..... E21B 7/04 175/45
2003/0120427 A1 * 6/2003 Chapman ..... E21B 7/04 702/6
2005/0194185 A1 * 9/2005 Gleitman ..... E21B 47/00 175/45
2008/0275648 A1 * 11/2008 Illfelder ..... E21B 47/022 702/7
2010/0243328 A1 * 9/2010 Rodriguez Herrera ... E21B 7/04 175/61
2013/0048383 A1 * 2/2013 Panchal ..... E21B 44/00 175/61
2014/0196950 A1 * 7/2014 Bayliss ..... E21B 7/04 175/27
2014/0374159 A1 * 12/2014 McElhinney ..... E21B 43/305 175/45
2015/0006227 A1 * 1/2015 Benson ..... G06Q 10/06313 705/7.23
2015/0186567 A1 * 7/2015 Wu ..... G06F 17/10 703/2

(Continued)

*Primary Examiner* — Kenneth Whittington
(74) *Attorney, Agent, or Firm* — Haynes and Boone, LLP

(57) ABSTRACT

Systems, devices, and methods for generating steering instructions to directing the operation of a drilling system are provided. The systems, devices, and methods may include determining an optimized path to navigate a Bottom Hole Assembly (BHA) to a steering target using one or more steering methods, such as straight line projections, rotary drilling projections, True Vertical Depth, Inclination, and Azimuth (TIA) calculations, and three dimensional "J" (3DJ) calculations, and driving the BHA to the steering target using the optimized path.

20 Claims, 9 Drawing Sheets

(56) References Cited

U.S. PATENT DOCUMENTS

| | | | | |
|---|---|---|---|---|
| 2015/0330209 | A1* | 11/2015 | Panchal | E21B 7/04 700/275 |
| 2016/0003008 | A1* | 1/2016 | Uribe | E21B 7/04 175/50 |
| 2016/0024847 | A1* | 1/2016 | Benson | E21B 49/00 175/24 |
| 2017/0306702 | A1* | 10/2017 | Summers | E21B 44/02 |
| 2018/0051552 | A1* | 2/2018 | Li | E21B 44/00 |
| 2019/0345771 | A1* | 11/2019 | Zalluhoglu | E21B 41/0092 |

* cited by examiner

AUTOMATIC STEERING INSTRUCTIONS FOR DIRECTIONAL MOTOR DRILLING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present disclosure is directed to systems, devices, and methods for providing steering instructions for drilling systems. In particular, the present disclosure includes generating automatic steering instructions for directional motor drilling systems.

BACKGROUND OF THE DISCLOSURE

At the outset of a drilling operation, drillers typically establish a drill plan that includes a steering target (or steering objective location) and a drilling path to the steering objective location. Once drilling commences, the bottom hole assembly (BHA) may be directed or "steered" from a vertical drilling path in any number of directions, to follow the proposed drill plan. For example, to recover an underground hydrocarbon deposit, a drill plan might include a vertical bore to the side of a reservoir containing a deposit, then a directional or horizontal bore that penetrates the deposit. The operator may then follow the plan by steering the BHA through the vertical and horizontal aspects in accordance with the plan.

In slide drilling implementations, such directional drilling requires accurate orientation of a bent housing of the down hole motor. The bent housing is set on surface to a predetermined angle of bend. The high side of this bend is referred to as the toolface of the BHA. In such slide drilling implementations, rotating the drill string changes the orientation of the bent housing and the BHA, and thus the toolface. To effectively steer the assembly, the operator must first determine the current toolface orientation, such as via measurement-while-drilling (MWD) apparatus. Thereafter, if the drilling direction needs adjustment, the operator must rotate the drill string or alter other surface drilling parameters to change the toolface orientation.

During drilling, a "survey" identifying locational and directional data of a BHA in a well is obtained at various intervals. Each survey yields a measurement of the inclination angle from vertical and azimuth (or compass heading) of the survey probe in a well (typically 40-50 feet behind the total depth at the time of measurement). In directional wellbores, particularly, the position of the wellbore must be known with reasonable accuracy to ensure the correct steering of the wellbore path. The measurements themselves include inclination from vertical and the azimuth of the well bore. In addition to the toolface data, and inclination, and azimuth, the data obtained during each survey may also include hole depth data, pipe rotary data, hook load data, delta pressure data (across the down hole drilling motor), and modeled dogleg data, for example.

These measurements may be taken at discrete points in the well, and the approximate path of the wellbore may be computed from the data obtained at these discrete points. Conventionally, a standard survey is conducted at each drill pipe increment or at each stand length, at approximately every 95 feet, to obtain an accurate measurement of inclination and azimuth for the new survey position.

As a drilling operation proceeds, the operator is required to assess the results of each survey, enter the results into a standalone computer or other calculation device, formulate a visual mental impression of the overall orientation of the drilling BHA, and try to formulate a steering plan for the next 95 feet, based on this mental impression, before steering the system. This can be difficult, time consuming, and complex. Furthermore, this lengthy process can cause delays in drilling. A more efficient, reliable, and intuitive method for steering a BHA in a directional motor drilling system is needed.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
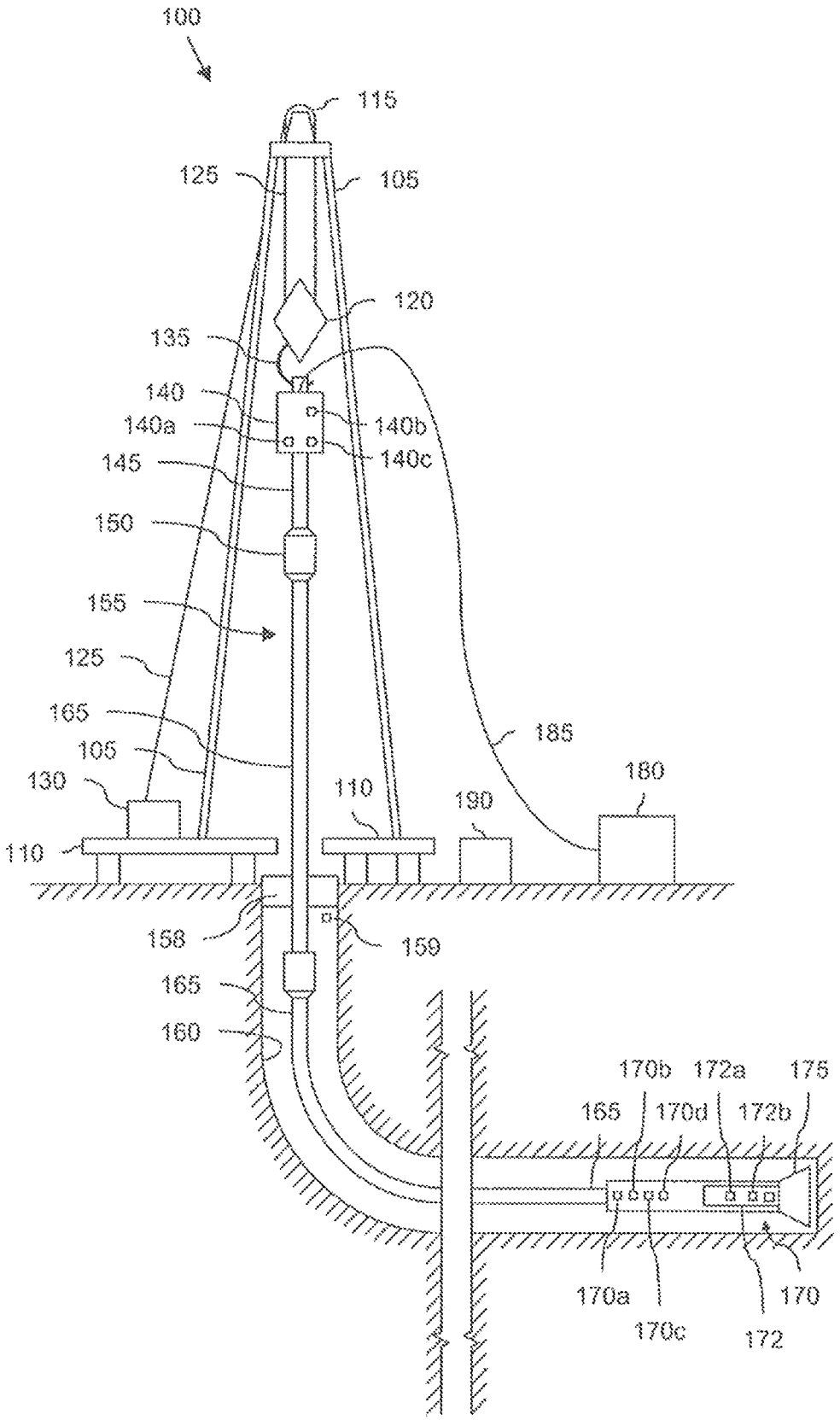
FIG. 1 is a schematic diagram of an exemplary drilling apparatus according to one or more aspects of the present disclosure.

It is to be understood that the following disclosure describes many different implementations, or examples, for implementing different features of various implementations. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various implementations and/or configurations discussed.

This disclosure introduces systems and methods to generate directional motor drilling instructions. In particular, the present disclosure includes generating automatic steering instructions for directional motor drilling systems. The present disclosure may reduce decision-making time for a drilling operator, thereby increasing the efficiency and effectiveness of the drilling procedure. In some implementations, the automatic steering instructions may include a number of directional motor drilling instructions that are generated by a controller. These systems and methods may be used to determine an optimized path to navigate a Bottom Hole Assembly (BHA) to a steering target using one or more steering methods, such as straight line projections, rotary drilling projections, True Vertical Depth, Inclination, and Azimuth (TIA) calculations, and three dimensional "J" (3DJ) calculations, and driving the BHA to the steering target using the optimized path.

Referring to FIG. 1, illustrated is a schematic view of apparatus 100 demonstrating one or more aspects of the present disclosure. The apparatus 100 is or includes a land-based drilling rig. However, one or more aspects of the present disclosure are applicable or readily adaptable to any type of drilling rig, such as jack-up rigs, semisubmersibles, drill ships, coil tubing rigs, well service rigs adapted for drilling and/or re-entry operations, and casing drilling rigs, among others within the scope of the present disclosure.

Apparatus 100 includes a mast 105 supporting lifting gear above a rig floor 110. The lifting gear includes a crown block 115 and a traveling block 120. The crown block 115 is coupled at or near the top of the mast 105, and the traveling block 120 hangs from the crown block 115 by a drilling line 125. One end of the drilling line 125 extends from the lifting gear to drawworks 130, which is configured to reel in and out the drilling line 125 to cause the traveling block 120 to be lowered and raised relative to the rig floor 110. The other end of the drilling line 125, known as a dead line anchor, is anchored to a fixed position, possibly near the drawworks 130 or elsewhere on the rig.

A hook 135 is attached to the bottom of the traveling block 120. A top drive 140 is suspended from the hook 135. A quill 145 extending from the top drive 140 is attached to a saver sub 150, which is attached to a drill string 155 suspended within a wellbore 160. Alternatively, the quill 145 may be attached to the drill string 155 directly. The term "quill" as used herein is not limited to a component which directly extends from the top drive, or which is otherwise conventionally referred to as a quill. For example, within the scope of the present disclosure, the "quill" may additionally or alternatively include a main shaft, a drive shaft, an output shaft, and/or another component which transfers torque, position, and/or rotation from the top drive or other rotary driving element to the drill string, at least indirectly. Nonetheless, albeit merely for the sake of clarity and conciseness, these components may be collectively referred to herein as the "quill."

The drill string 155 includes interconnected sections of drill pipe 165, a bottom hole assembly (BHA) 170, and a drill bit 175. The BHA 170 may include stabilizers, drill collars, and/or measurement-while-drilling (MWD) or wireline conveyed instruments, among other components. In some implementations, the BHA 170 includes a bent housing drilling system.

Implementations using bent housing drilling systems may require slide drilling techniques to effect a turn using directional drilling. For the purpose of slide drilling, the bent housing drilling systems may include a down hole motor with a bent housing or other bend component operable to create an off-center departure of the bit from the center line of the wellbore. The direction of this departure from the centerline in a plane normal to the centerline is referred to as the "toolface angle." The drill bit 175, which may also be referred to herein as a "tool," may have a "toolface," connected to the bottom of the BHA 170 or otherwise attached to the drill string 155. One or more pumps 180 may deliver drilling fluid to the drill string 155 through a hose or other conduit, which may be connected to the top drive 140.

The down hole MWD or wireline conveyed instruments may be configured for the evaluation of physical properties such as pressure, temperature, torque, weight-on-bit (WOB), vibration, inclination, azimuth, toolface orientation in three-dimensional space, and/or other down hole parameters. These measurements may be made down hole, stored in memory, such as solid-state memory, for some period of time, and downloaded from the instrument(s) when at the surface and/or transmitted in real-time to the surface. Data transmission methods may include, for example, digitally encoding data and transmitting the encoded data to the surface, possibly as pressure pulses in the drilling fluid or mud system, acoustic transmission through the drill string 155, electronic transmission through a wireline or wired pipe, transmission as electromagnetic pulses, among other methods. The MWD sensors or detectors and/or other portions of the BHA 170 may have the ability to store measurements for later retrieval via wireline and/or when the BHA 170 is tripped out of the wellbore 160.

In an exemplary implementation, the apparatus 100 may also include a rotating blow-out preventer (BOP) 158 that may assist when the well 160 is being drilled utilizing under-balanced or managed-pressure drilling methods. The apparatus 100 may also include a surface casing annular pressure sensor 159 configured to detect the pressure in an annulus defined between, for example, the wellbore 160 (or casing therein) and the drill string 155.

In the exemplary implementation depicted in FIG. 1, the top drive 140 is utilized to impart rotary motion to the drill string 155. However, aspects of the present disclosure are also applicable or readily adaptable to implementations utilizing other drive systems, such as a power swivel, a rotary table, a coiled tubing unit, a down hole motor, and/or a conventional rotary rig, among others.

The apparatus 100 also includes a controller 190 configured to control or assist in the control of one or more components of the apparatus 100. For example, the controller 190 may be configured to transmit operational control signals to the drawworks 130, the top drive 140, the BHA 170 and/or the pump 180. The controller 190 may be a stand-alone component installed near the mast 105 and/or other components of the apparatus 100. In an exemplary implementation, the controller 190 includes one or more systems located in a control room in communication with the apparatus 100, such as the general purpose shelter often referred to as the "doghouse" serving as a combination tool shed, office, communications center, and general meeting place. The controller 190 may be configured to transmit the operational control signals to the drawworks 130, the top drive 140, the BHA 170, and/or the pump 180 via wired or wireless transmission devices which, for the sake of clarity, are not depicted in FIG. 1.

The controller 190 is also configured to receive electronic signals via wired or wireless transmission devices (also not shown in FIG. 1) from a variety of sensors included in the apparatus 100, where each sensor is configured to detect an operational characteristic or parameter. Depending on the implementation, the apparatus 100 may include a down hole annular pressure sensor 170a coupled to or otherwise associated with the BHA 170. The down hole annular pressure sensor 170a may be configured to detect a pressure value or range in an annulus shaped region defined between the external surface of the BHA 170 and the internal diameter of the wellbore 160, which may also be referred to as the casing pressure, down hole casing pressure, MWD casing pressure, or down hole annular pressure. Measurements from the down hole annular pressure sensor 170a may include both static annular pressure (pumps off) and active annular pressure (pumps on).

It is noted that the meaning of the word "detecting," in the context of the present disclosure, may include detecting, sensing, measuring, calculating, and/or otherwise obtaining data. Similarly, the meaning of the word "detect" in the context of the present disclosure may include detect, sense, measure, calculate, and/or otherwise obtain data.

The apparatus 100 may additionally or alternatively include a shock/vibration sensor 170b that is configured to detect shock and/or vibration in the BHA 170. The apparatus 100 may additionally or alternatively include a mud motor pressure sensor 172a that is configured to detect a pressure differential value or range across one or more motors 172 of the BHA 170. The one or more motors 172 may each be or include a positive displacement drilling motor that uses hydraulic power of the drilling fluid to drive the drill bit 175, also known as a mud motor. One or more torque sensors 172b may also be included in the BHA 170 for sending data to the controller 190 that is indicative of the torque applied to the drill bit 175 by the one or more motors 172.

The apparatus 100 may additionally or alternatively include a toolface sensor 170c configured to detect the current toolface orientation. The toolface sensor 170c may be or include a conventional or future-developed magnetic toolface sensor which detects toolface orientation relative to magnetic north. Alternatively, or additionally, the toolface sensor 170c may be or include a conventional or future-developed gravity toolface sensor which detects toolface orientation relative to the Earth's gravitational field. The toolface sensor 170c may also, or alternatively, be or include a conventional or future-developed gyro sensor. The apparatus 100 may additionally or alternatively include a WOB sensor 170d integral to the BHA 170 and configured to detect WOB at or near the BHA 170.

The apparatus 100 may additionally or alternatively include a torque sensor 140a coupled to or otherwise associated with the top drive 140. The torque sensor 140a may alternatively be located in or associated with the BHA 170. The torque sensor 140a may be configured to detect a value or range of the torsion of the quill 145 and/or the drill string 155 (e.g., in response to operational forces acting on the drill string). The top drive 140 may additionally or alternatively include or otherwise be associated with a speed sensor 140b configured to detect a value or range of the rotary speed of the quill 145.

The top drive 140, drawworks 130, crown or traveling block, drilling line or dead line anchor may additionally or alternatively include or otherwise be associated with a WOB sensor 140c (WOB calculated from a hook load sensor that can be based on active and static hook load, e.g., one or more sensors installed somewhere in the load path mechanisms to detect and calculate WOB, which can vary from rig to rig) different from the WOB sensor 170d. The WOB sensor 140c may be configured to detect a WOB value or range, where such detection may be performed at the top drive 140, drawworks 130, or other component of the apparatus 100.

The detection performed by the sensors described herein may be performed once, continuously, periodically, and/or at random intervals. The detection may be manually triggered by an operator or other person accessing a human-machine interface (HMI), or automatically triggered by, for example, a triggering characteristic or parameter satisfying a predetermined condition (e.g., expiration of a time period, drilling progress reaching a predetermined depth, drill bit usage reaching a predetermined amount, etc.). Such sensors and/or other detection elements may include one or more interfaces which may be local at the well/rig site or located at another, remote location with a network link to the system.

Figure 2:
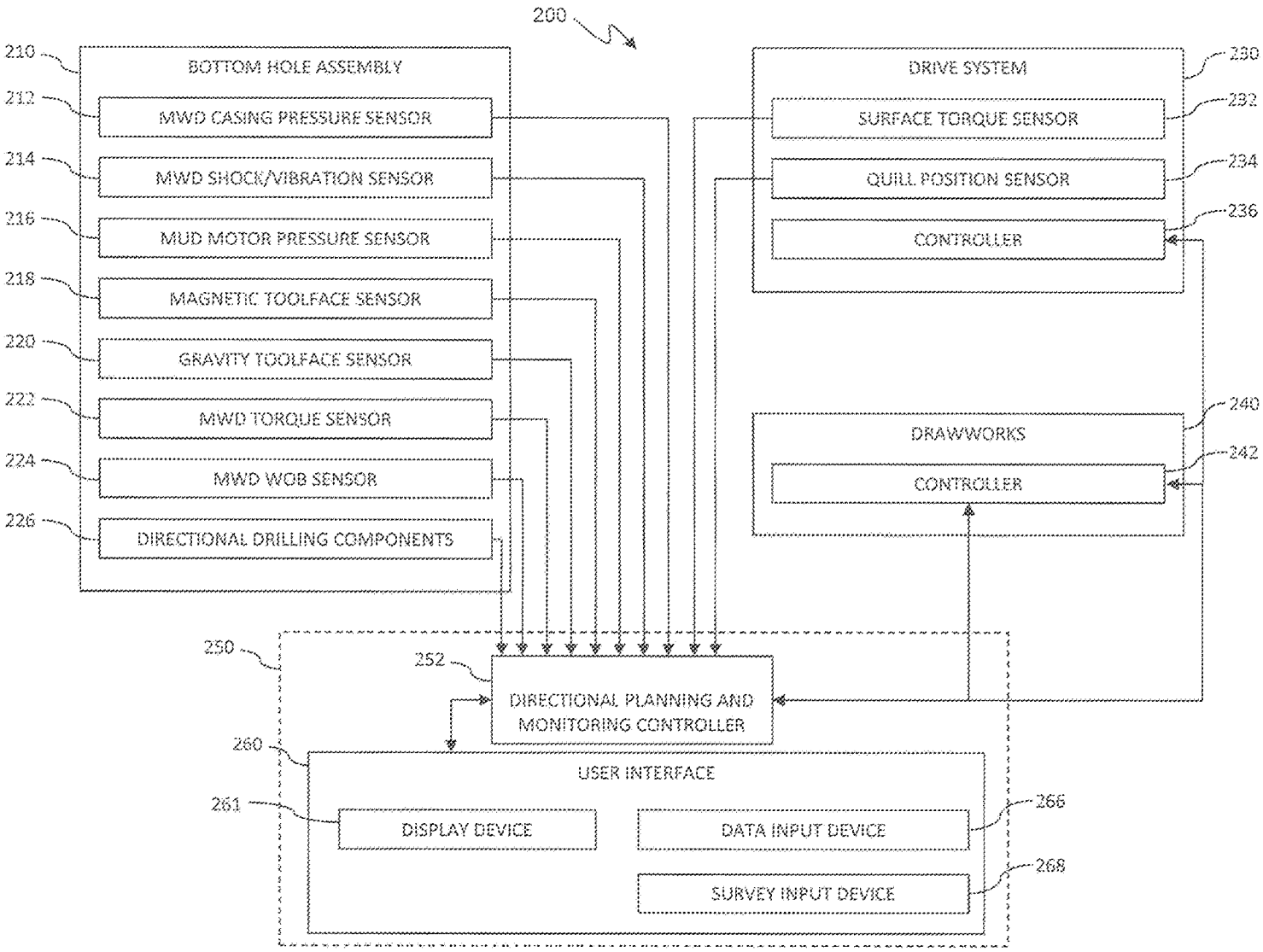
FIG. 2 is a schematic diagram of an exemplary sensor and control system according to one or more aspects of the present disclosure.

Referring to FIG. 2, illustrated is a block diagram of an apparatus 200 according to one or more aspects of the present disclosure. The apparatus 200 includes a user interface 260, a BHA 210, a drive system 230, a drawworks 240, and a directional planning and monitoring controller 252. The apparatus 200 may be implemented within the environment and/or apparatus shown in FIG. 1. For example, the BHA 210 may be substantially similar to the BHA 170 shown in FIG. 1, the drive system 230 may be substantially similar to the top drive 140 shown in FIG. 1, the drawworks 240 may be substantially similar to the drawworks 130 shown in FIG. 1, and the directional planning and monitoring controller 252 may be substantially similar to the controller 190 shown in FIG. 1.

The user interface 260 and the directional planning and monitoring controller 252 may be discrete components that are interconnected via wired or wireless devices. Alternatively, the user interface 260 and the directional planning and monitoring controller 252 may be integral components of a single system or controller 250, as indicated by the dashed lines in FIG. 2.

The user interface 260 may include a data input device 266 that permits a user to input one or more toolface set points. This may also include inputting other set points, limits, and other input data. The data input device 266 may include a keypad, voice-recognition apparatus, dial, button, switch, slide selector, toggle, joystick, mouse, data base and/or other conventional or future-developed data input device. Such data input device 266 may support data input from local and/or remote locations. Alternatively, or additionally, the data input device 266 may include one or more devices for providing a user selection of predetermined toolface set point values or ranges, such as via one or more drop-down menus. The toolface set point data may also or alternatively be selected by the directional planning and monitoring controller 252 via the execution of one or more database look-up procedures. In general, the data input device 266 and/or other components within the scope of the present disclosure support operation and/or monitoring from stations on the rig site as well as one or more remote locations with a communications link to the system, network, local area network (LAN), wide area network (WAN), Internet, satellite-link, and/or radio, among other communication types.

The user interface 260 may also include a survey input device 268. The survey input device 268 may include information gathered from sensors regarding the orientation and location of the BHA 210. In some implementations, survey input device 268 is automatically entered into the user interface at regular intervals. The survey input device 268 may be used to determine an initial position of the BHA 210 for generating steering instructions.

The user interface 260 may also include a display device 261 arranged to present visualizations of a down hole environment, such as a two-dimensional visualization and/or a three-dimensional visualization. The display device 261 may be used for visually presenting information to the user in textual, graphic, or video form. Depending on the implementation, the display device 261 may include, for example, an LED or LCD display computer monitor, touchscreen display, television display, a projector, or other display device. Some examples of information that may be shown on the display device 261 will be discussed in further detail with reference to FIGS. 3-5. In some implementations, the display device 261 is used to display instructions and/or visualizations of steering instructions for directing the BHA 210.

In some implementations, instructions for driving the BHA may be generated for each stand length of the drill string. In some cases, the set of instructions may be generated during the drilling of a stand length. Alternatively, the set of instructions may be generated after a first stand length has been drilled by the BHA and before the drilling of the next stand length. These instructions may be viewed by an operator and may automatically drive the BHA.

The BHA 210 may include a MWD casing pressure sensor 212 that is configured to detect an annular pressure value or range at or near the MWD portion of the BHA 210, and that may be substantially similar to the down hole annular pressure sensor 170a shown in FIG. 1. The casing pressure data detected via the MWD casing pressure sensor 212 may be sent via electronic signal to the directional planning and monitoring controller 252 via wired or wireless transmission.

The BHA 210 may also include an MWD shock/vibration sensor 214 that is configured to detect shock and/or vibration in the MWD portion of the BHA 210, and that may be substantially similar to the shock/vibration sensor 170b shown in FIG. 1. The shock/vibration data detected via the MWD shock/vibration sensor 214 may be sent via electronic signal to the directional planning and monitoring controller 252 via wired or wireless transmission.

The BHA 210 may also include a mud motor pressure sensor 216 that is configured to detect a pressure differential value or range across the mud motor of the BHA 210, and that may be substantially similar to the mud motor pressure sensor 172a shown in FIG. 1. The pressure differential data detected via the mud motor pressure sensor 216 may be sent via electronic signal to the directional planning and monitoring controller 252 via wired or wireless transmission. The mud motor pressure may be alternatively or additionally calculated, detected, or otherwise determined at the surface, such as by calculating the difference between the surface standpipe pressure just off-bottom and pressure once the bit touches bottom and starts drilling and experiencing torque.

The BHA 210 may also include a magnetic toolface sensor 218 and a gravity toolface sensor 220 that are cooperatively configured to detect the current toolface, and that collectively may be substantially similar to the toolface sensor 170c shown in FIG. 1. The magnetic toolface sensor 218 may be or include a conventional or future-developed magnetic toolface sensor which detects toolface orientation relative to magnetic north. The gravity toolface sensor 220 may be or include a conventional or future-developed gravity toolface sensor which detects toolface orientation relative to the Earth's gravitational field. In an exemplary implementation, the magnetic toolface sensor 218 may detect the current toolface when the end of the wellbore is less than about 7° from vertical, and the gravity toolface sensor 220 may detect the current toolface when the end of the wellbore is greater than about 7° from vertical. However, other toolface sensors may also be utilized within the scope of the present disclosure, including non-magnetic toolface sensors and non-gravitational inclination sensors. In any case, the toolface orientation detected via the one or more toolface sensors (e.g., magnetic toolface sensor 218 and/or gravity toolface sensor 220) may be sent via electronic signal to the directional planning and monitoring controller 252 via wired or wireless transmission.

The BHA 210 may also include an MWD torque sensor 222 that is configured to detect a value or range of values for torque applied to the bit by the motor(s) of the BHA 210, and that may be substantially similar to the torque sensor 172b shown in FIG. 1. The torque data detected via the MWD torque sensor 222 may be sent via electronic signal to the directional planning and monitoring controller 252 via wired or wireless transmission.

The BHA 210 may also include a MWD WOB sensor 224 that is configured to detect a value or range of values for WOB at or near the BHA 210, and that may be substantially similar to the WOB sensor 170d shown in FIG. 1. The WOB data detected via the MWD WOB sensor 224 may be sent via electronic signal to the directional planning and monitoring controller 252 via wired or wireless transmission.

Depending upon the implementation, the BHA 210 may also include one or more directional drilling components 226 such as bent housing system components. In some implementations, the directional drilling components 226 may include a drilling motor that forms part of the BHA 170.

The drawworks 240 may include a controller 242 and/or other devices for controlling feed-out and/or feed-in of a drilling line (such as the drilling line 125 shown in FIG. 1). Such control may include rotary control of the drawworks (in versus out) to control the height or position of the hook, and may also include control of the rate the hook ascends or descends.

The drive system 230 may include a surface torque sensor 232 that is configured to detect a value or range of the reactive torsion of the quill or drill string, much the same as the torque sensor 140a shown in FIG. 1. The drive system 230 also includes a quill position sensor 234 that is configured to detect a value or range of the rotary position of the quill, such as relative to true north or another stationary reference. The surface torsion and quill position data detected via the surface torque sensor 232 and the quill position sensor 234, respectively, may be sent via electronic signal to the directional planning and monitoring controller 252 via wired or wireless transmission. The drive system 230 also includes a controller 236 and/or other devices for controlling the rotary position, speed and direction of the quill or other drill string component coupled to the drive system 230 (such as the quill 145 shown in FIG. 1).

The directional planning and monitoring controller 252 may be configured to receive data from the user interface 260, the BHA 210, the drawworks 240, and/or the drive system 230, and utilize such data to continuously, periodically, or otherwise determine the current toolface orientation. The directional planning and monitoring controller 252 may be further configured to generate a control signal, such as via intelligent adaptive control, and provide the control signal to the drive system 230 and/or the drawworks 240 to adjust and/or maintain the toolface orientation. For example, the directional planning and monitoring controller 252 may provide one or more signals to the drive system 230 and/or the drawworks 240 to increase or decrease WOB and/or quill position, such as may be required to accurately "steer" the drilling operation.

The directional planning and monitoring controller 252 may also be used to generate optimized paths based on projections or slides to meeting steering targets down hole. These optimized paths may be generated to provide an efficient drilling solution that minimizes planning and drilling time and effort.

Figure 3:
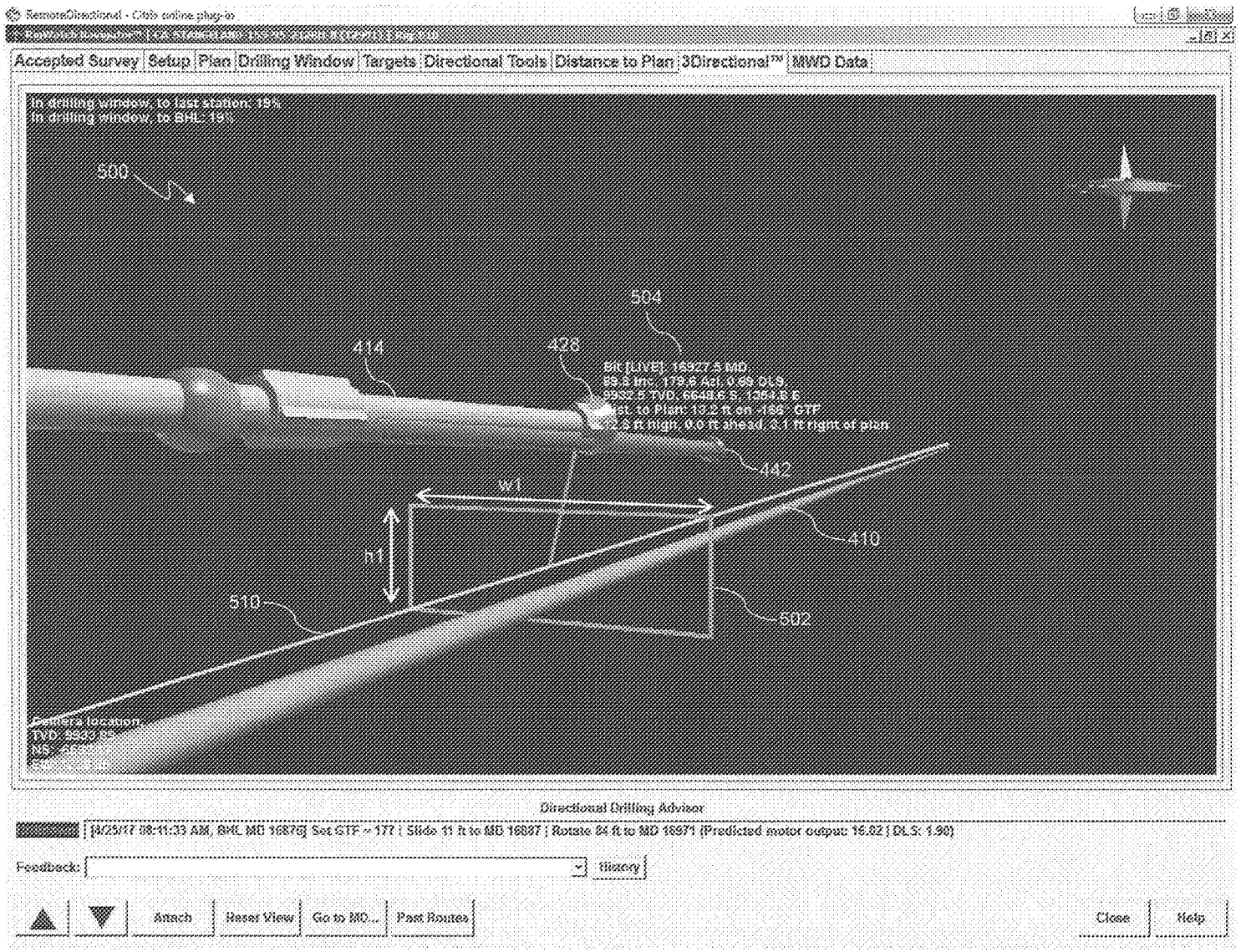
FIG. 3 is a representation of an exemplary display apparatus showing a three-dimensional visualization with a drilling window according to one or more aspects of the present disclosure.

FIG. 3 shows a three-dimensional HMI 500 including a drill plan 410, modified drill plan 510, and drilling window 502. For example, the HMI 500 may include three-dimensional depictions of a drill plan 410, a modified drill plan 510, and a drilled wellbore 414. The HMI 500 may also include an index 504 showing data related to the position of the BHA showing the position of the BHA 428.

In some implementations, a drilling window 502 is placed around a portion of the drill plan 410 or modified drill plan 510. In some implementations, a modified drill plan 510 is established during the drilling operation representing a change in response to updated data related to geology or equipment. For example, the modified drill plan 510 is shifted slightly to the left of the drill plan 410. Although a single drilling window 502 is shown in FIG. 3, in some implementations, a series of drilling windows 502 are placed along the drill plan 410. In the example of FIG. 3, the drilling window 502 is disposed around a generally horizontal portion of the drill plan 410. The drilling window 502 may be placed in a plane perpendicular to the longitudinally extending drill plan 410. In the example of FIG. 3, the drilling window 502 has a rectangular shape with width w1 and height h1. The drilling window 502 may be connected with other drilling windows such that the drilling windows form extruded rectangular prisms along the drill plan 410. In other implementations, the drilling window 502 may have other shapes such as, for example, square, polygon, circle, ellipse, overall and/or irregular shapes.

The drilling windows 502 may be generated with boundaries that define acceptable deviation from a drill plan or a modified drill plan. As such, the drilling windows 502 may correspond with the drilling tolerance at a particular place on the drill plan 410. For example, the width w1 may correspond with a tolerance in the x-direction (with respect to the drill plan 410) and the height h1 may correspond with tolerance in the y-direction. Some factors that may dictate the size or shape of the drilling window 502 may include proximity to other wellbores, whether planned or already drilled, geological formations including formations targeted and formations to be avoided, geological layers generally, the size of any deposits, and other factors. In the example of FIG. 3, w1 is about 60 feet and h1 is about 30 feet. Other dimensions of drilling windows are possible, for example 50 feet by 20 feet, 30 feet by 30 feet, 15 feet by 15 feet, and other dimensions. In this case, the drill plan is nearly horizontal, so the tolerance in the x-direction is a horizontal tolerance while the tolerance in the y-direction is a vertical tolerance. In the example of FIG. 3, the horizontal tolerance is greater than the vertical tolerance and so w1 is greater than h1. This may be the case because during the horizontal portions of some drill plans, vertical errors can be more costly than horizontal errors due to the position of geological layers and/or a desire to have multiple wellbores close together. In other locations along the drill plan, such as vertical or near-vertical sections, the drilling windows 502 may have tolerances in the x- and y-directions that are nearly equal. In other implementations, the dimensions of the one or more drilling windows 502 may have other shapes, such as curves, polygons, circles, ellipses, and irregular shapes. These shapes may be chosen to conform the drilling tolerances around a drill plan and may be changed throughout a drilling operation.

The orientation, position, and size of each drilling window 502 may be varied independently. In some implementations, the drilling windows 502 are centered on the drill plan 410, while in other implementations, one or more drilling windows 502 are offset from the drill plan 410. The drilling windows 502 may be placed at regular intervals along the drill plan 410, such as about every 10 feet or 3 meters. In other implementations, drilling windows 502 are placed at about every 1 foot, at about every 20 feet, or at about every 50 feet. Some implementations include drilling windows spaced apart by a distance equivalent to a drill string stand. In one example, a drill string stand has a length between about 90 and 110 feet. The intervals between drilling windows 502 may be varied. For example, in difficult sections of the drill plan 410, the drilling windows 502 may be placed closer together to help an operator more easily visualize the correct route. In the example of FIG. 3, the drilling window 502 is roughly perpendicular to the drill plan 410, but drilling windows may be placed at different angles relative to the drill plan 410, such that each drilling window 502 has a particular tilt or "dip angle" relative to the drill plan 410. In some implementations, drilling windows generated with dip angles may not include the original well plan along their entire length. For example, drilling windows may be generated with a dip angle and may not include the original well plan along their entire length. This may occur in certain environments where geological steering information informs directional drillers that the original drill plan does not coincide with an ideal drill plan and changes are required. The changes may be facilitated by the offsets and tilt angles of the drilling windows.

The three-dimensional HMI 500 of FIG. 3 also shows a depiction of the drilled wellbore 414. The depiction of the drilled wellbore 414 may include a depiction the BHA 428 in a location relative to the drill plan 410 and a projected position 442 of the BHA. In the example of FIG. 3, the location of the BHA 428 is compared to the modified drill plan 510 and the drilling window 502 by a controller in the drilling system (such as controller 252 as shown in FIG. 2). Information comparing these features is shown in index 504. In some implementations, normal plan clearance calculations are carried out by the controller to compare the location of the BHA 428 to a drill plan 410 or modified drill plan 510. These calculations may be based on points of interest along the drilled wellbore 414 as well as a corresponding point of interest on the drill plan 410 or modified drill plan 510. The controller 242 may render results of the normal plane clearance calculations in polar directions and distances, which may be converted to a rectangular offsets by an algorithm run by the controller 242.

Figure 4B:
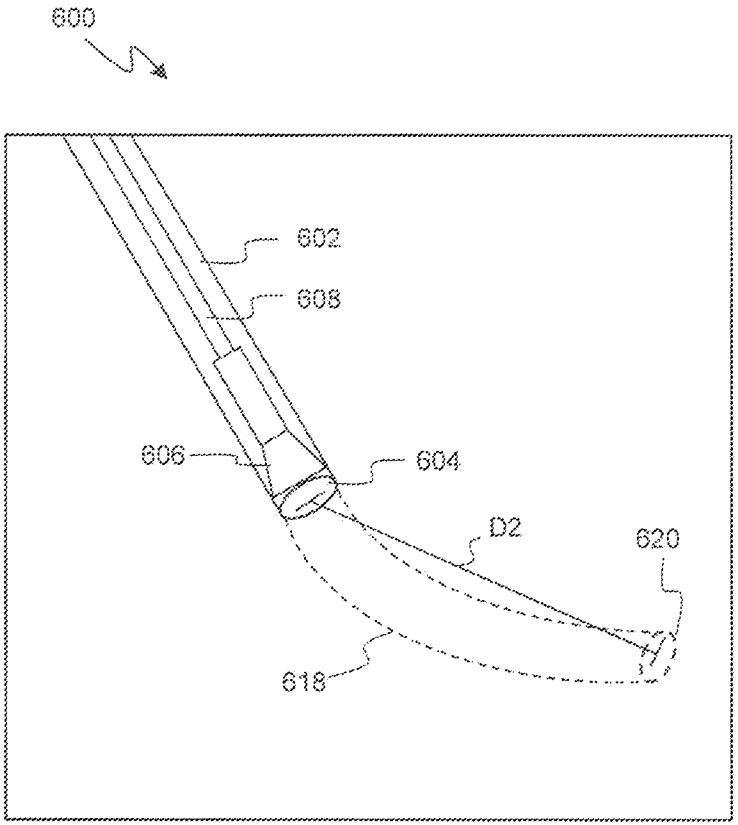
FIG. 4B is another representation of a down hole environment including a wellbore according to one or more aspects of the present disclosure.
Figure 4A:
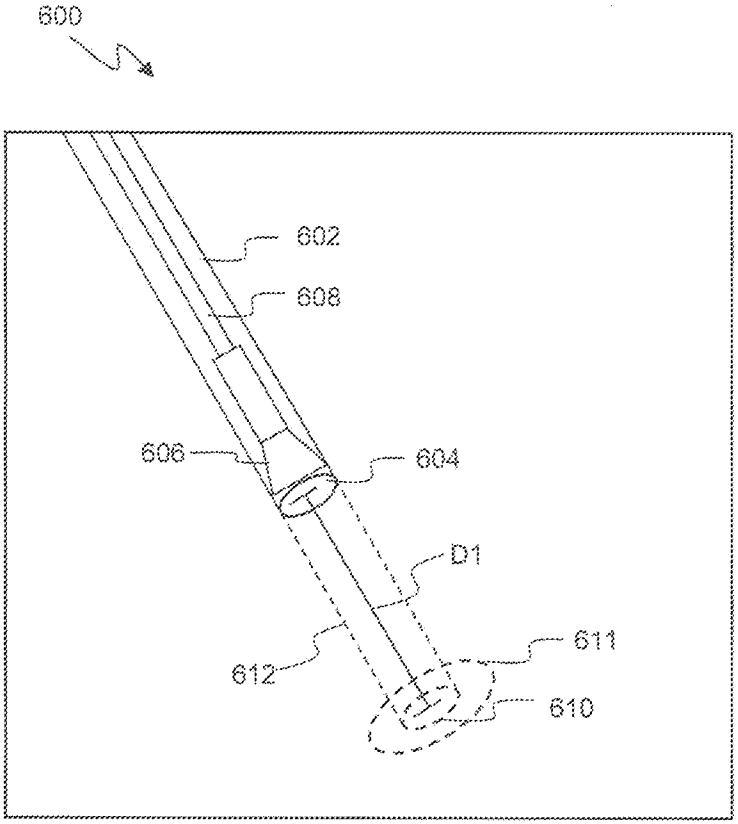
FIG. 4A is a representation of a down hole environment including a wellbore according to one or more aspects of the present disclosure.

FIGS. 4A and 4B show exemplary representations of a down hole environment 600 including a down hole portion of a drilling system including a BHA 606 and drill string 608. In some implementations, instructions to drive the BHA 606 to various drilling targets or steering objective locations in the down hole environment 600 may be generated by the controller 252.

In some implementations, the drill string 608 is made up of a number of tubulars. The BHA 606 and drill string 608 correspond to the BHA 170 and drill string 155, and may form a portion of the drilling apparatus 100 as described with reference to FIG. 1. FIGS. 4A and 4B show the BHA 606 and drill string 608 within a drilled bore, with an end of the drilled bore designated by the reference number 604, and referred to herein as a bore end 604. The bore end 604 may represent the bottom of a wellbore 602 drilled by the BHA 606. In some implementations, the bore end 604 corresponds to the location of the BHA 606, and the location of the bore end 604 may be determined by determining the location of the BHA 606. In some implementations, the location of the BHA 606, and therefore the location of the bore end 604, is determined each time that a tubular or stand is introduced to the drill string 608. In some implementations, a stand is made up of a number of tubulars. In some implementations, the location of the bore end 604 is determined every 95 feet. Of course, some tubulars or stands have lengths greater than or less than 95 feet, and the systems described herein, utilizing the directional planning and monitoring controller 252 in FIG. 2, may be configured to determine the location of the BHA 606 and bore end 604 at other incremental lengths.

In some implementations, the directional planning and monitoring controller 252 may determine the location of the BHA 606 and bore end 604 by conducting a survey each time a new tubular or stand is introduced to the drill string. Accordingly, when stands having a length of approximately 95 feet are introduced to the drill string, the survey may be taken every 95 feet. The results of this survey, identifying the location and orientation of the BHA 606, may be compared with a drill plan stored in the controller 252 to determine whether the path of the BHA 606 conforms to the drill plan and/or is within a given tolerance distance, or an acceptable deviation, from the drill plan. The acceptable deviation may be a predetermined value that may form part of the drill plan. With the survey known, the directional planning and monitoring controller 252 may use the survey to generate a steering target 610 (or a steering objective) to which the BHA should be steered to follow the well plan. In some implementations, the steering target 610 is surrounded by a tolerance area 611. The tolerance area 611 may represent a zone of acceptable tolerance for the BHA around the steering target 610. In some implementations, the tolerance area 611 has a circular or elliptical shape that is centered on the steering target 610. In other implementations, the tolerance area 611 is offset from the steering target 610 and/or has different shapes, such as rectangular, polygonal, etc. In some implementations, the steering target 610 and tolerance area 611 are represented by a drilling window 502 as shown in FIG. 3, as well as in FIGS. 5-7.

The steering target 610 may be located along the drill plan or may be generated to steer the BHA 606 closer to the drill plan. The steering target 610 may also correspond to the expected position of the next survey. For example, when surveys are taken at every 95 feet of drilling, the steering target may be calculated to be about 95 feet from the bore end 604 after the most recent survey. In this manner, the drilling direction may be updated while drilling in 95 feet increments. This may help ensure that the actual drilled bore corresponds at least generally to the drill plan. Although 95 foot increments are used as an example, it should be apparent that any incremental length could be used, and that the incremental length may correspond to the length of a tubular or stand introduced into the drill string.

The steering target 610 location may be located a certain distance from the BHA 606. For example, a steering target 610 may be placed at a distance of 200-300 feet, 240-260 feet, 300-500 feet, 400-500 feet, or 440-460 feet from the BHA 606, as well as other distances. Multiple steering targets 610 may be identified by the controller 252, such as 2, 3, 4, 5, or other numbers.

When the bore end 604 and the steering target 610 are known, the directional planning and monitoring controller 252 may determine a desired drill path to move the BHA 606 from the current bore end 604 to the tolerance area 611 or steering target 610. The monitoring controller 252 may generate one or more sets of directional motor instructions to steer the BHA 606 to the tolerance area 611 or steering target 610.

In the example of FIG. 4A, the directional planning and monitoring controller 252 may be used to determine the steering target 610 a distance D1 along the drill path as a steering objective for the BHA 606. The distance D1 may correspond to the length of a stand or tubular introduced to the drill string, or may be some other length. In the example shown in FIG. 4A, the steering target 610 may be considered "in line" with the wellbore 602, and therefore may not require any adjustment of the orientation of the BHA 606. In this example, a straight line projection of the BHA (i.e., the projected path of the BHA without any curvature) aligns with the steering target 610. Therefore, the directional driller operator may drill the distance D1 along the drill path with the BHA 606 straight ahead without changing the orientation of the BHA 606 to arrive at the steering target 610. In this case, repositioning of the toolface (to effect a turn in the drilling path) is not required. Accordingly, since there is no need to change directions, slide drilling is not required.

FIG. 4B shows a representation of a down hole environment 600 with a bore end 604 which may be determined by a survey and a steering target 620 that is not in line with the wellbore 602. The steering target 620 is located a distance D2 from the bore end. In some implementations, the distance D2 may represent the distance of a tubular or stand being introduced to the drill string. Similar to the steering target 610 in FIG. 4A, the steering target 620 of FIG. 4B may be determined at a point on a pre-determined drill path, or may be determined as an intermediate point direct in the wellbore 602 toward the predetermined drill path. In the example of FIG. 4B, the system may be used to generate instructions to move the BHA from the bore end 604 to the steering target 620. In some implementations, the directional planning and monitoring controller 252 receives the coordinates of both the bore end 604 and the steering target 620. Using these coordinates, the directional planning and monitoring controller 252 may be configured to generate an optimized path 618 along which to drive the BHA 606 from the bore end 604 (or from the BHA's current position) to the steering target 620. The optimized path 618 may include one or more slides. These slides may be accomplished by changing the toolface angle of the BHA and driving the BHA for a specified distance. The slides may create curvature in the drilled well when the BHA driven along the optimized path 618. By selecting the optimized path 618 with a specific amount of curvature, the BHA may be driven to the steering target 620. The optimized path 618 may include a combination of slides and straight projections. The optimized path may be calculated using various slide profiles. For example, the optimized path may include one or more True Vertical Depth, Inclination, and Azimuth (TIA) calculations, as well as one or more three dimensional "J" (3DJ) profiles. These profiles are discussed in more detail with reference to FIGS. 8 and 9.

Figure 5:
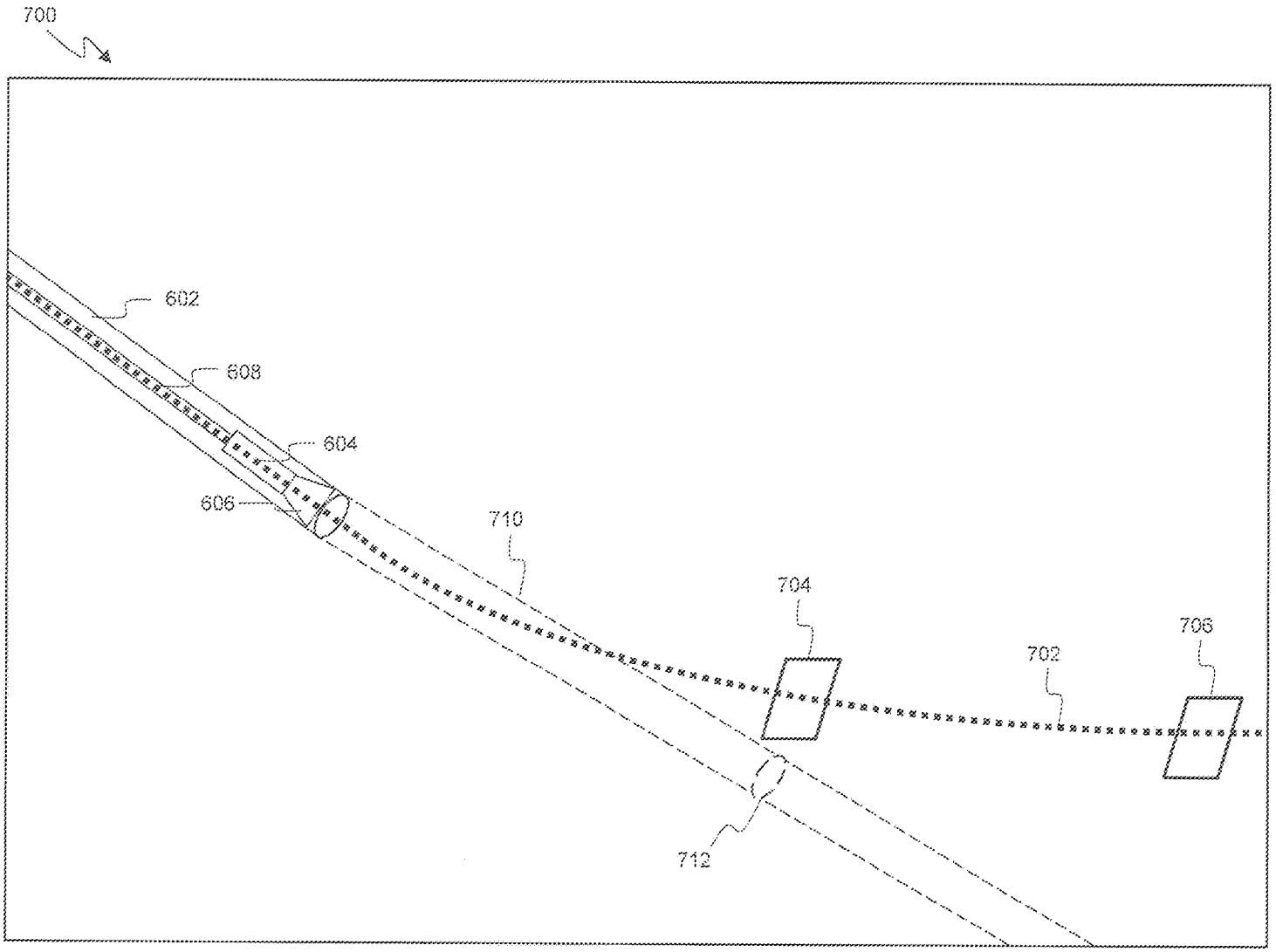
FIG. 5 is a representation of a down hole environment including a drill plan according to one or more aspects of the present disclosure.

FIG. 5 shows an example of a downhole environment 700 including a BHA 606 that is being driven along a drill plan 702. The drill plan 702 may be input at the outset of a drilling operation and may be modified during the drilling operation to account for factors such as lithology, equipment performance, time constraints, as well as other factors. In some implementations, one more steering targets 704, 706 are identified. These steering targets 704, 706 may be the drilling windows 502 as discussed in reference to FIG. 3. In some implementations, the steering targets 704, 706 are placed along the drill plan 702. In other implementations, the steering targets 704, 706 are offset from the drill plan 702. The operator may seek to steer the BHA 606 to the one or more steering targets 704, 706 by performing steps with a controller, such as controller 252 shown in FIG. 2. In some implementations, the controller 252 may be used to produce a set of instructions to direct the BHA 606 to the steering targets 704, 706. These steering instructions may be produced very quickly after a survey is recorded, for example in milliseconds. The quick and accurate generation of steering instructions may save rig time which may translate to cost savings on the well.

In some implementations, the steering instructions are calculated by using a measured bit position. This may be the position of the BHA 606. The bit position may be a starting point for the optimized path calculated by the controller. The bit position may be determined using survey data, drilling data (such as a curvature limit and a toolface orientation), and data from one or more sensors on the drilling rig, for example, sensors located downhole.

In some implementations, the steering instructions take into account all adjustments which have been made to the drill plan 702. The steering instructions may also conform to operator best practices for directional drilling. For example, the steering instructions may take into account "no slide zones" (zones where sliding the BHA is not recommended), slide length limitations related to depth, dogleg severity limitations by depth, etc. For example, at a certain depth, a dogleg severity limitation may be 4.5 degrees per hundred feet. This may represent the limit for curvature of the drilled wellbore. The steering instructions may take these limitations into account such that no optimized path produced by the controller 252 includes curvature of over 4.5 degrees per hundred feet.

In some implementations, the controller 252 may be used to calculate a projected bit position 712 which may be compared the one or more steering targets 704, 706. In some implementations, the projected bit position 712 is calculated using the determined bit position of the BHA 606, as well as modeling of previous projections. For example, the steering instructions may take into account slide drilling intervals as well as rotary drilling intervals between the last survey station and the calculated bit location. In some implementations, the projected bit position 712 maybe calculated 40-60 feet ahead of the survey locations. In other implementations, the projected bit position 712 is 90-100 feet, 30-50 feet, 100-200 feet, 200-300 feet, 400-500 feet, or other distances ahead of the survey locations.

In some implementations, the controller 252 may be used to calculate a straight line projection 612 of the BHA 606. The straight line projection 612 may be configured to not include curvature, as shown in FIG. 4A. The controller 252 may then be used to compare the straight line projection 612 to the steering target 704, 706 to determine whether the projected bit location 712 falls within the outer boundaries of the one or more steering targets 704, 706, and is therefore a good fit for the one or more steering targets. Projected bit locations 712 on straight line projections 612 may be compared with the one or more steering targets 704, 706 before other methods for generating optimized paths are used, because straight line drilling operations may be easier to accomplish that other methods.

If the controller 252 determines that the projected bit location 712 does not fall within the outer boundaries of the one or more steering targets 704, 706, the controller 252 may be used to calculate rotary drilling trends based on previous drilling data. These rotary drilling trends may account for the natural "drift" or curvature of the drill bit based on the lithology as well as the equipment itself. The rotary drilling trends may be measured as a rate of change in inclination and a rate of change in azimuth. The rate of change in inclination may be referred to as "build" and the rate of change in azimuth may be referred to as "walk." For example, a specific BHA 606 may have a rotary drilling build trend of ½ degree per hundred feet. The controller 252 may be used to calculate a rotary drilling projection 710 based on the rotary drilling trends. This rotary drilling projection 710 may show the potential route of the BHA 606 if the drill string is rotated without any change in the toolface orientation. The controller 252 may compare a projected bit location 712 on the rotary drilling projection 710 to the one or more steering targets 704, 706 to determine if the rotary drilling projection 710 is a good fit. In the example of FIG. 5, the projected bit location 712 does not reach either of the steering targets 704, 706 and is therefore not a good fit.

Figure 6:
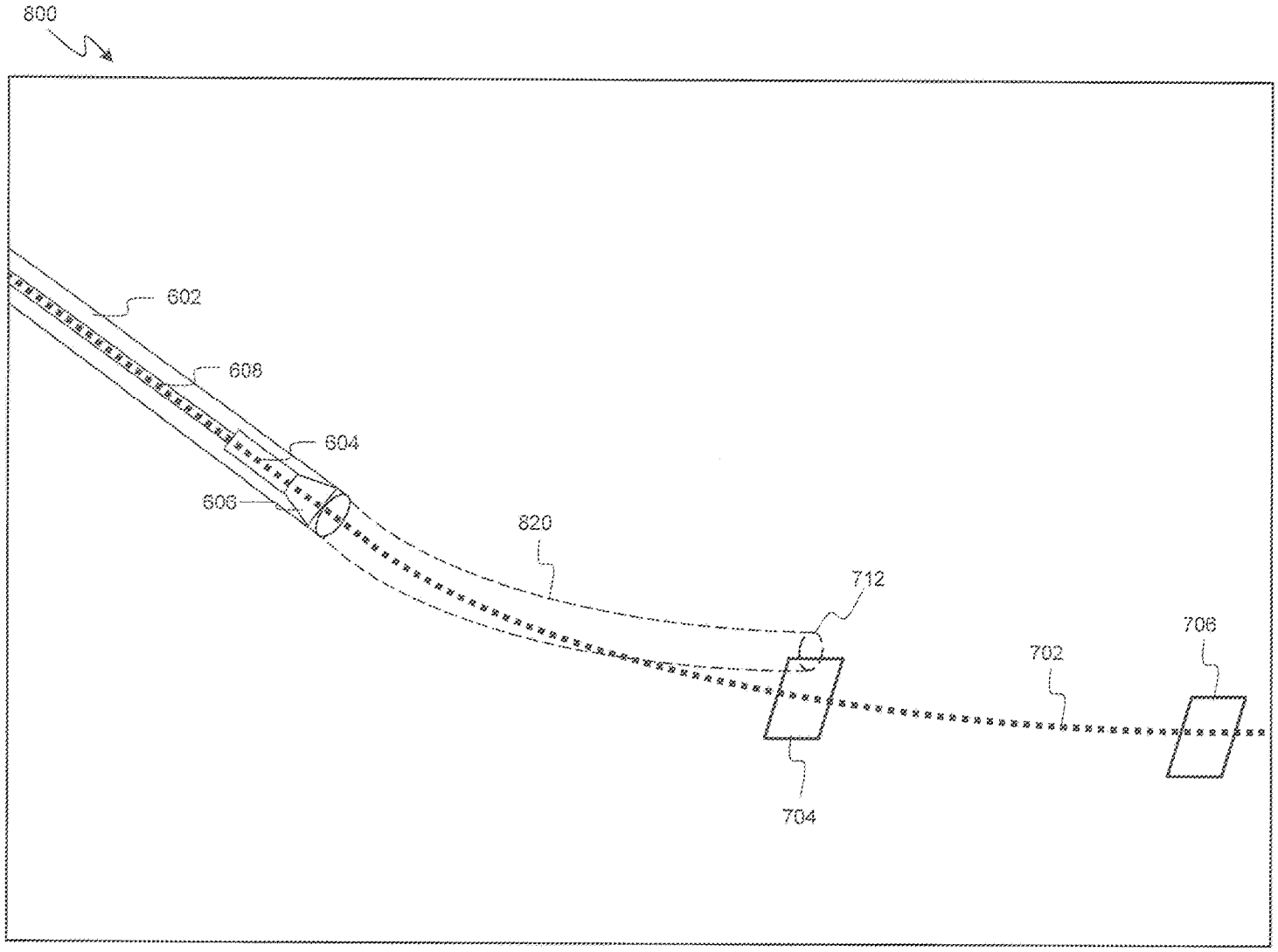
FIG. 6 is another representation of a down hole environment including a drill plan according to one or more aspects of the present disclosure.
Figure 7:
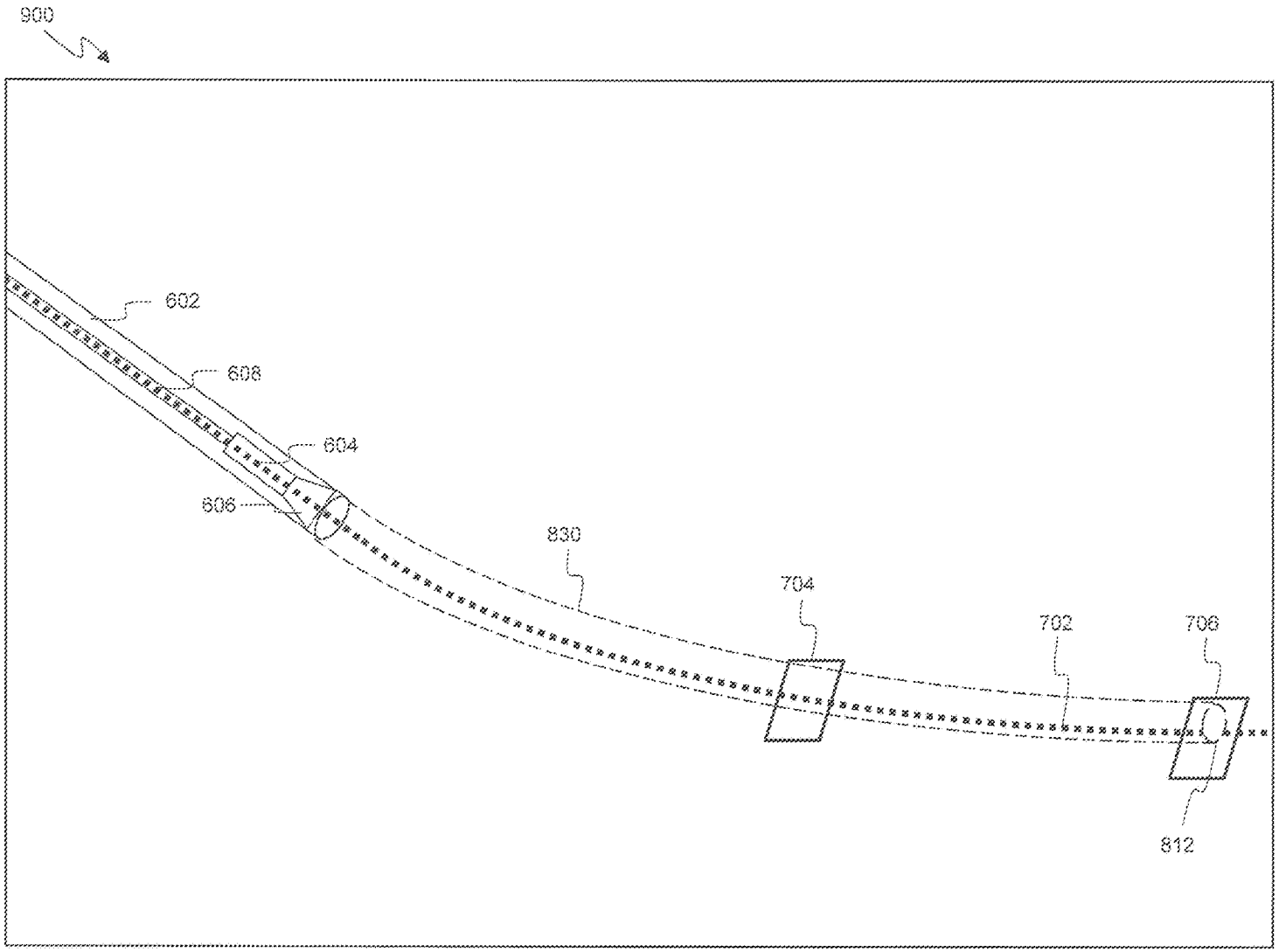
FIG. 7 is another representation of a down hole environment including a drill plan according to one or more aspects of the present disclosure.

If the controller 252 determines that the straight line projection and the rotary drilling projection 710 are not good fits for the one or more steering targets 704, 706, the controller 252 may calculate one or more slides to the one or more steering targets 704, 706, as show in FIGS. 6 and 7.

FIG. 6 shows an example of a down hole environment 800 including a BHA 606 that is being driven along a drill plan 702. In some implementations, the controller 252 may have determined that a slide is necessary to drive the BHA 606 to the steering target 704. In this case, the controller 252 may be used to generate an optimized path 820 to the steering target 704 that includes a slide. The slide may be calculated using a slide model, such as one or more TIA or 3DJ calculations. In some implementations, a 3DJ calculation is calculated based on a single target point with an x, y, and z coordinate. The 3DJ calculation may not be vector-based. In some implementations, the 3DJ calculation has a tendency to overshoot the drill plan 702 after reaching a steering target 704 on the drill plan 702.

The TIA calculations may be vector-based, and may be further based on inclination and azimuth coordinates. In some implementations, TIA calculations may involve a smaller amount of curvature than corresponding 3DJ calculations (i.e., may not meet the steering target 704 as quickly), but TIA calculations may have more of a tendency to match up with the drill plan 702.

In some implementations, the controller 252 may be used to generate a first optimized path 820 using a TIA calculation first if a slide is found to be necessary. The controller 252 may then be used to compare a projected bit location 712 on the optimized path 820 to determine if the projected bit location 712 falls within the steering target 704. If not, the controller 252 may be used to calculate a second optimized path 830 to a second steering target 706, as shown in FIG. 7. In some implementations, the second steering target 706 is located further away from the BHA 606 than the first steering target 704. For example, the first steering target 704 may be located between 200-300 feet away from the BHA 606 while the second steering target 706 is located between 400-500 feet away from the BHA 606. Other distances are also possible. The second optimized path 830 may be calculated using a TIA calculation. The controller 252 may then compare a projected bit position 812 on the second optimized path 830 to the second target 706 to determine if the second optimized path 830 is a good fit. As discussed above, a good fit describes an optimized path that places the BHA within a tolerance area around the steering target 704, 706.

If the controller 252 determines that the second optimized path is not a good fit, the controller 252 may then calculate a first optimized path 820 to the first steering target 704 using a 3DJ calculation. If the first optimized path 820 using the 3DJ calculation is not found to be a good fit, the controller 252 may be used to calculate a second optimized path 830 to the second steering target 706 using the 3DJ calculation.

Once the controller 252 determines which projection or optimized path is the best fit, the controller 252 may be used to transmit instructions to drive the BHA 606 based on the best fit. For example, the controller 252 may display the projection to an operator on a display device. If an optimized path using a curve is found to be the best fit, the controller 252 may be used to determine an optimal toolface angle and distance to slide and transmit this data to an operator. The toolface angle may be determined by the controller 252 as the optimized path is calculated. In some implementations, the distance to slide is calculated based on the curvature limit of the BHA 606. The curvature limit of the BHA 606 may be the maximum amount of curvature that the BHA 606 can accomplish in drilling a wellbore. In some implementations, the curvature limit may be calculated by removing outliers from previous slides (such as slides with a large amount of curvature) and analyzing the dogleg severity (or curve) of the remaining slides. Once the curvature limit of the BHA 606 is determined, this value may be compared to the curvature (or "dogleg severity") of the optimized path. By comparing this curvature the curvature limit of the BHA 606, the distance to slide may be calculated. For example, the curvature of an optimized path may be 4 degrees. If the controller 252 determines that the curvature limit of the BHA 606 is 12 degrees per hundred feet, the distance to slide could be calculated as 32 feet (i.e., the distance required to achieve the curvature of the optimized path=12/4×95 ft). The distance to slide and the toolface angle may be displayed to an operator on a display device.

In some implementations, multiple slides may be used during a drilling operation. These slides may include both TIA and 3DJ calculations. In some implementations, an operator may alternate between using curves calculated with TIA calculations and curves calculated using 3DJ calculations. In some implementations, a certain ratio of slides with TIA calculations as compared with slides with 3DJ calculations may be used to effectively match the wellbore to the drill plan. For example, a ratio of 2:1 for iterations of TIA calculations as compared to iterations of 3DJ calculations may be used. Other ratios of iterations may also be used, such as 1:1, 3:1, 1:2, and 1:3.

Figure 8:
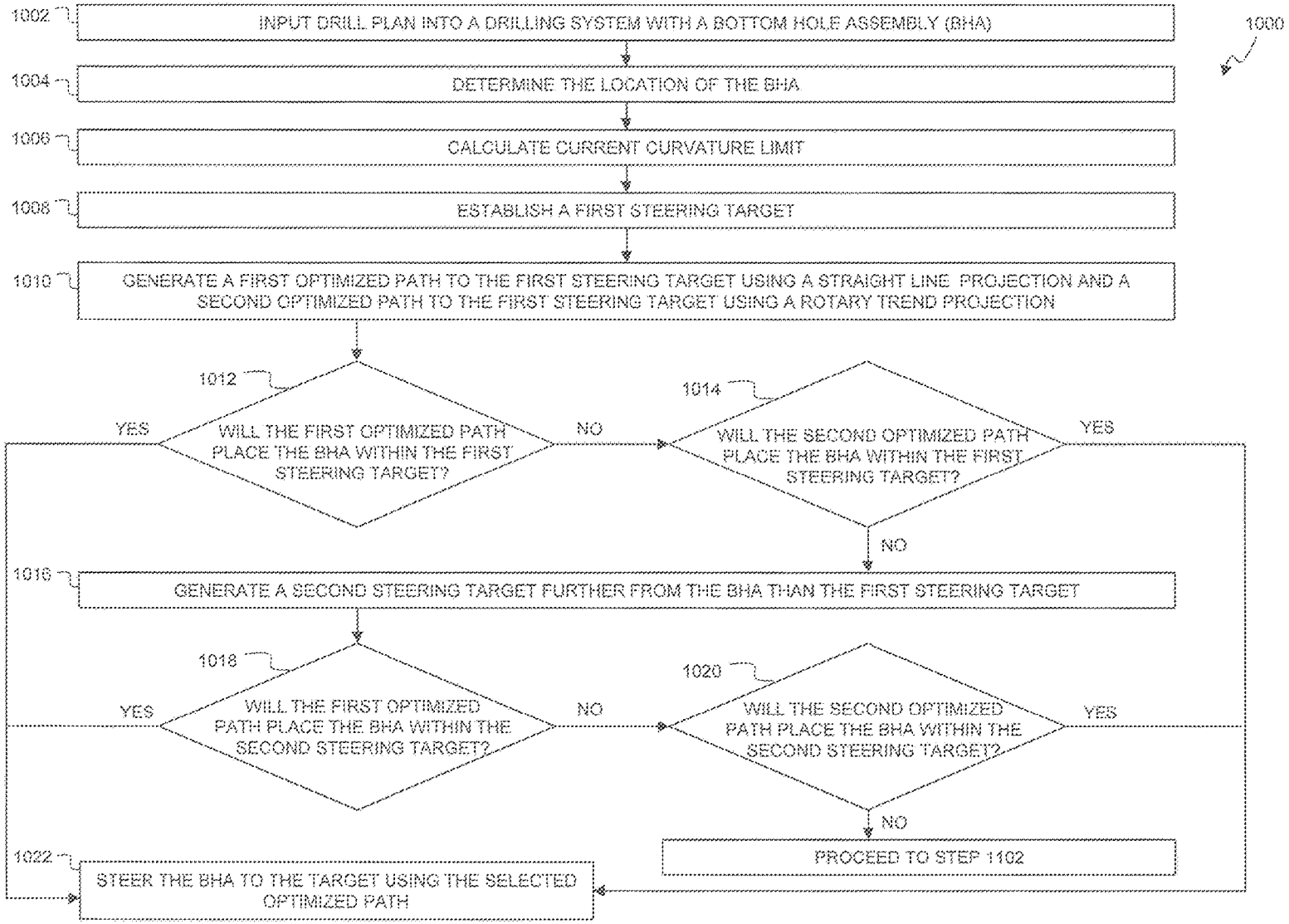
FIG. 8 is a flowchart diagram of a method of directing operation of a drilling system according to one or more aspects of the present disclosure.
Figure 9:
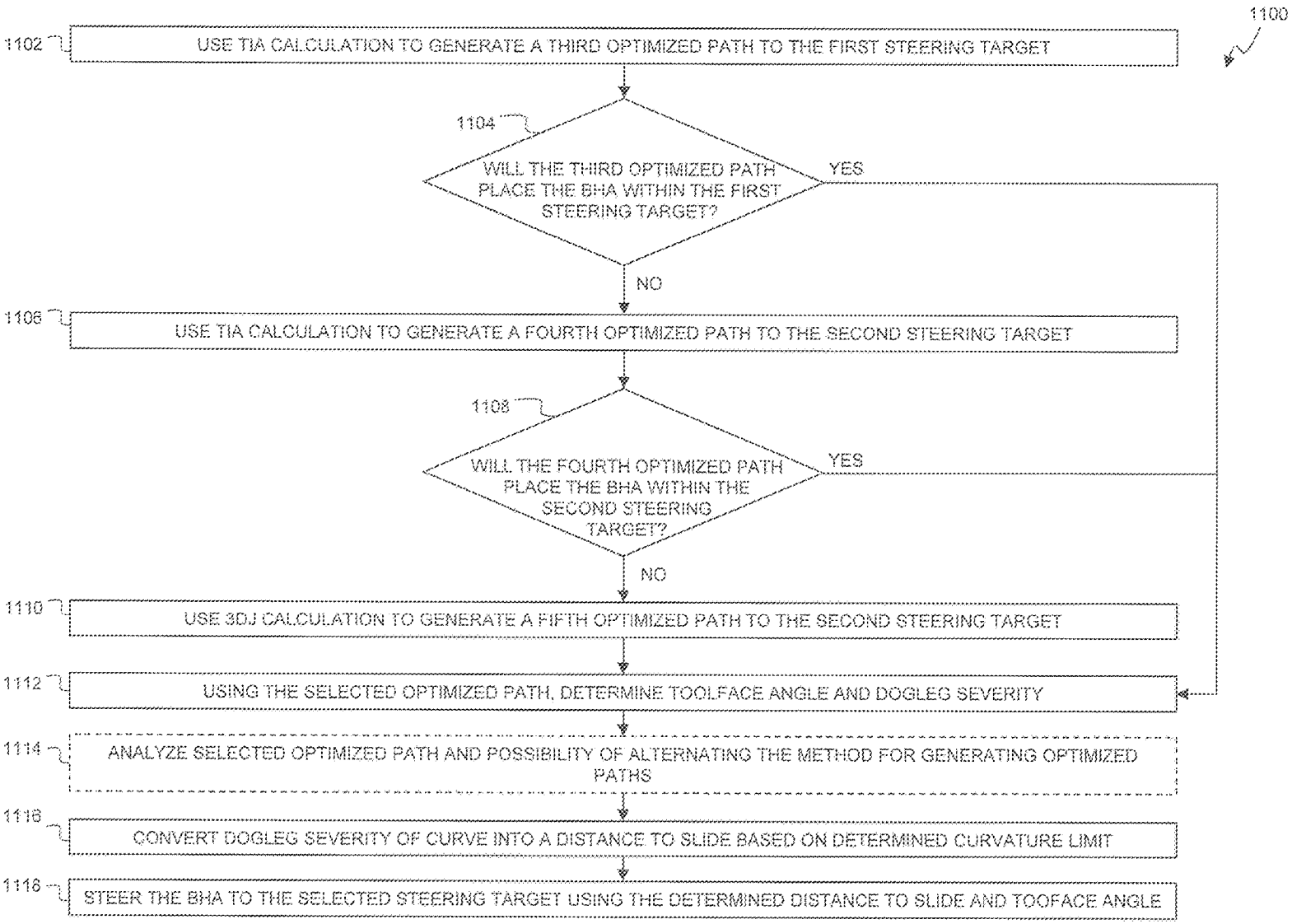
FIG. 9 is a flowchart diagram of another method of directing operation of a drilling system according to one or more aspects of the present disclosure.

FIGS. 8 and 9 are flowchart diagrams of methods 1000, 1100 of directing the operation of a drilling system according to one or more aspects of the present disclosure. It is understood that additional steps can be provided before, during, and after the steps of methods 1000 and 1100, and that some of the steps described can be replaced or eliminated for other implementations of the methods 1000 and 1100. In particular, any of the control systems disclosed herein, including those of FIGS. 1 and 2, and the display of FIG. 3, may be used to carry out the methods 1000 and 1100. In some implementations, method 1100 follows method 1000.

At step 1002, the method 1000 may include inputting a drill plan into a drilling system with a BHA. This may be accomplished by entering location and orientation coordinates into a controller such as the directional planning and monitoring controller 252 discussed with reference to FIG. 2. The drill plan may also be entered via the user interface, and/or downloaded or transferred to directional planning and monitoring controller 252. The directional planning and monitoring controller 252 may therefore receive the drill plan directly from the user interface or a network or disk transfer or from some other location. In some implementations, the BHA is part of a drilling apparatus such as the drilling apparatus 100 discussed in conjunction with FIG. 1. The drilling apparatus 100 may comprise a motor, a toolface, and one or more sensors. The drilling apparatus 100 may include a directional drilling system. The drilling apparatus may be operated by a user who inputs commands in a user interface that is connected to the drilling apparatus. The commands may include drilling a hole to advance the BHA through a subterranean formation.

At step 1004, the method 1000 may include determining the location of the BHA. The determination of location of the BHA may include receiving, with the directional planning and monitoring controller 252, positional data of the BHA. The positional data may be generated from various sources, including a survey conducted by the BHA at the end of a drilling increment as well as sensors on the drilling rig. In some implementations, positional data is gathered throughout the drilling operation by sensors disposed on the BHA or various other locations on the drilling rig, such as the drawworks. The positional data may be used to determine the location of the BHA at a given moment in time, such as at the end of a drilling increment. In some implementations, inclination data is received by the controller 252 continuously. In this case, the steering instructions generated by the controller 252 (including the steps of methods 1000 and 1100) may be continuously updated to account for variations or tendencies in inclination. With the location of the BHA known, the method proceeds to step 1006.

At step 1006, the method 1000 may include calculating the current curvature limit of the BHA. The curvature limit may be calculated by determining the maximum amount of curvature that the BHA is able to achieve by drilling. The curvature limit may be stored memory and used in subsequent steps.

At step 1008, the method 1000 may include establishing a first steering target. The first steering target may be any of the steering targets 610, 704, 706 as discussed in reference to FIGS. 4A-7, as well as the steering window 502 as discussed in reference to FIG. 3. The first steering target may include a surrounding tolerance area. In some implementations, the first steering target is placed along the drill plan. In other implementations, the first steering target is offset from the drill plan. The first steering target may be placed approximately 250 feet from the BHA. In other implementations, the first steering target is placed 200-300 feet, 300-400 feet, 240-260 feet, or other distances from the BHA.

At step 1010, the method 1000 may include generating a first optimized path to the first steering target using a straight line projection and a second optimized path to the first steering target using a rotary trend projection. In some implementations, the straight line projection is similar to the straight line projection 612 as shown in FIG. 4A. The rotary trend projection may be similar to the rotary trend projection 710 as shown in FIG. 7. The rotary trend projection may take into account a natural amount of curvature along the wellbore that is created without changing the toolface angle.

At step 1012, the method 1000 may include determining if the first optimized path will place the BHA within the first steering target. In some implementations, this step 1012 may include determining if the first optimized path passes through an outer boundary of the first steering target. In other implementations, this step may include determining if the first optimized path will contact any point of a first steering target. If the first optimized will place the BHA within the first steering target, the method 1000 may proceed to step 1022 and the BHA may be steered to the target using the first optimized path. Step 1022 may also include transmitting instructions to the drive system 230, the drawworks 240, and/or the BHA 210 as shown in FIG. 2, as well as displaying the instructions on a display device. In some implementations, the instructions include a distance to drive the BHA that may be approximately the distance between the BHA and the first or second steering target. If the first optimized path is determined to not place the BHA within the first steering target, the method 1000 may proceed to step 1014.

At step 1014, the method 1000 may include determining whether the second optimized path will place the BHA within the first steering target. If so, the method 1000 may proceed to step 1022. If not, the method 1000 may proceed to step 1016.

At step 1016, the method 1000 may include generating a second steering target further from the BHA than the first steering target. In some implementations, the second steering target is placed further down the drill plan than the first steering target. The second steering target may be placed approximately 450 feet from the BHA. In other implementations, the second steering target is placed 400-500, 300-600, 180-600, or 440-460 feet from the BHA, as well as other distances. In some implementations, the first steering target may be placed the distance of a single typical stand length from the BHA and the second steering target may be placed the distance of two typical stand lengths from the BHA.

At step 1018, the method 1000 may include determining whether the first optimized path will place the BHA within the second steering target. This step may help to minimize time and effort on the drilling rig because it may help an operator avoid performing one or more slides. Since slides may take more time to calculate and perform than simply rotating the drill string, the method 1000 may include steps 1018 and 1020 to determine if simply lengthening the optimized path with the projections will place the BHA along drill plan. If the first optimized path is determined to place the BHA within the second steering target, the method 1000 proceeds to step 1022. If not, the method proceeds to step 1020.

At step 1020, the method 1000 may include determining whether the second optimized path will place the BHA within the second steering target. If so, the method 1000 may proceed to step 1022. If not, the method may proceed to step 1102 of method 1100.

FIG. 9 is a flowchart diagram of a method 1100 of directing operation of a drilling system according to one or more aspects of the present disclosure. Method 1100 may follow the steps of method 1000. In some implementations, method 1100 is used to generate an optimized path using a slide to navigate the BHA to the one or more drilling targets.

At step 1102, the method 1100 may include using a TIA calculation to generate a third optimized path to the first steering target. The TIA calculation may be vector-based and may be used to produce a curve with an endpoint that is near the first steering target. In some implementations, the TIA calculation is also based on inclination and azimuth coordinates. Both TIA calculations and 3DJ calculations may be referred to as slide models.

At step 1104, the method 1100 may include determining if the third optimized path with place the BHA within the first steering target. If so, the method 1100 may proceed to step 1112. If not, the method 1100 may proceed to step 1106.

At step 1106, the method 1100 may include using the TIA calculation to generate a fourth optimized path to the second steering target. As discussed above, the second steering target may be placed further away from the BHA than the first steering target.

At step 1108, the method 1100 may include determining whether the fourth optimized path will place the BHA within the second steering target. If so, the method 1100 may proceed to step 1112. If not, the method 1100 may proceed to step 1110.

At step 1110, the method 1100 may include using a 3DJ calculation to generate a fifth optimized path to the second steering target. In some implementations, the 3DJ calculation is based on an endpoint with Cartesian coordinates (x, y, z). In some implementations, the 3DJ calculation may not be vector based. In some implementations, first, second, third, and fourth optimized paths may include a lesser amount of curvature (including no curvature) than an optimized path based on the 3DJ calculation. Thus, the 3DJ calculation may be used after other options are analyzed to minimize the amount of curvature in the selected optimized path.

At step 1112, the method 1100 may include using the selected optimized path to determine toolface angle and dogleg severity. In the case that the first or second optimized path is selected, the toolface angle is not changed from the current location of the BHA and dogleg severity is nominal. In the case that the third, fourth, or fifth optimized path is selected, the toolface angle and dogleg severity is calculated based on the TIA or 3DJ calculation.

At step 1114, the method 1100 may include analyzing the selected optimized path and the possibility of alternating the method for generating optimized paths. This step 1114 may include determining the previous methods for generating optimized paths, such as accessing records of optimized paths used from a memory module. The method for generating optimized paths (such as using a TIA or 3DJ calculation) may be alternated. For example, if a 3DJ calculation was used to generate the optimized path used to create the last slide, a TIA calculation may attempted for the current slide. Alternating the type of optimized path generation may lead to drilling operations that more closely follow a drill plan. In some implementations, the ideal ratio of optimized paths using TIA calculations compared to optimized paths using 3DJ calculations is 2:1. In other implementations, the ratio may be 1:1, 1:2, or other ratios.

At step 1116, the method 1100 may include converting the dogleg severity of the curve of the selected optimized path into a distance to slide based on the determined curvature limit. This conversion may include comparing the angle of the dogleg severity to the angle over distance of the curvature limit. The distance to slide may be displayed to an operator with the determined toolface angle of step 1112.

At step 1118, the method 1100 may include steering the BHA to the selected steering target using the determined distance to slide and toolface angle.

In an exemplary implementation within the scope of the present disclosure, the methods 1000 and 1100 repeat after step 1022 or 1118, such that method flow goes back to step 1004 and begins again. Iteration of methods 1000 and 1100 may be utilized to carry out a drilling operation including a number of increments.

In view of all of the above and the figures, one of ordinary skill in the art will readily recognize that the present disclosure introduces a drilling apparatus including: a drill string comprising a plurality of tubulars; a bottom hole assembly (BHA) disposed at a distal end of the drill string; a controller in communication with the BHA, wherein the controller is configured to: identify a first steering target; calculate a curvature limit of the BHA; determine whether the BHA can be driven to the first steering target using one of a straight line projection or a rotary drilling projection; calculate a first optimized steering path to the first steering target using one or more calculation using a slide model if the BHA cannot be driven to the first steering target using the one of the straight line projection or the rotary drilling projection; and determine a toolface angle and a distance to slide if the BHA cannot be driven to the first steering target using the one of the straight line projection or the rotary drilling projection.

In some implementations, the drilling apparatus further includes a display device configured to display the determined toolface angle and distance to slide to a user. The drilling apparatus may include a sensor system connected to the drill string and configured to detect one or more measureable parameters of the BHA, the one or more measureable parameters indicative of a position and an orientation of the BHA. The controller may be further configured to: calculate the first optimized steering path to the first steering target using a TIA calculation; determine whether the BHA can be driven to the first steering target along the first optimized steering path; and calculate a second optimized steering path to the first steering target using a 3DJ calculation if the BHA cannot be driven to the first steering target along the first optimized steering path. The controller may be further configured to determine the distance to slide using the calculated curvature limit. In some implementations, a distance between the first steering target and the BHA is between 200 and 300 feet.

The controller may be further configured to identify a second steering target if the BHA cannot be driven to the first steering target using the one of the straight line projection or the rotary drilling projection, wherein a distance between the second steering target and the BHA is greater than a distance between the first steering target and the BHA. The controller may be further configured to determine whether the BHA can be driven to the second steering target using the one of the straight line projection or the rotary drilling projection. The distance between the second steering target and the BHA may be between 300 and 500 feet.

The controller may be further configured to identify a third steering target, wherein a distance between the third steering target and the BHA is greater than the distance between the second steering target and the BHA. The controller may be further configured to calculate a third optimized steering path to a third steering target using a ratio of 2:1 for iterations of TIA calculations compared to iterations of 3DJ calculations.

A method of directing operation of a drilling system is also provided, which may include: identifying, with a controller in communication with the drilling system, a first steering target; calculating, with the controller, a curvature limit of a bottom hole assembly (BHA) of the drilling system; determining, with the controller, whether the BHA can be driven to the first steering target using one of a straight line projection or a rotary drilling projection; calculating, with the controller, a first optimized steering path to the first steering target using one or more slide models if the BHA cannot be driven to the first steering target using the one of the straight line projection or the rotary drilling projection; determining, with the controller, a toolface angle and a distance to slide if the BHA cannot be driven to the first steering target using the one of the straight line projection or the rotary drilling projection; and driving the BHA to the first steering target using the straight line projection, the rotary drilling projection, or the determined toolface angle and distance to slide.

The method may further include calculating, with the controller, a first optimized steering path to the first steering target using a TIA calculation; determining, with the controller, whether the BHA can be driven to the first steering target along the first optimized steering path; and calculating, with the controller, a second optimized steering path to the first steering target using a 3DJ calculation if the BHA cannot be driven to the first steering target along the first optimized steering path. The method may include determining the distance to slide using the calculated curvature limit.

In some implementations, the method includes identifying, with the controller, a second steering target if the BHA cannot be driven to the first steering target using the one of a straight line projection or the rotary drilling projection, wherein a distance between the second steering target and the BHA is greater than a distance between the first steering target and the BHA.

The method may include determining, with the controller, whether the BHA can be driven to the second steering target using one of a straight line projection or a rotary drilling projection. The method may include identifying, with the controller, a third steering target, wherein a distance between the third steering target and the BHA is greater than the distance between the second steering target and the BHA. The method may include calculating, with the controller, a third optimized steering path to the third steering target using a ratio of 2:1 for iterations of TIA calculations compared to iterations of 3DJ calculations.

A method of directing operation of a drilling system is also provided, which may include: identifying, with a controller in communication with the drilling system, a first steering target; determining, with the controller, a maximum possible curvature of a bottom hole assembly (BHA) of the drilling system; calculating, with the controller, a first optimized steering path to the first steering target using first slide model calculation; driving the BHA along the first optimized steering path if the first optimized steering path is determined to have a curvature less than the maximum possible curvature; calculating, with the controller, a second optimized steering path to the first steering target using second slide model calculation different than the first slide model calculation if the first optimized steering path is determined to have a curvature greater than the maximum possible curvature; and driving the BHA along the second optimized steering path if the first optimized steering path is determined to be have a curvature greater than the maximum possible curvature.

In some implementations, the method further includes: identifying, with the controller, a second steering target; calculating, with the controller, a third optimized steering path to the second steering target using a TIA calculation; driving the BHA along the third optimized steering path if the third optimized steering path is determined to have a curvature less than the maximum possible curvature; calculating, with the controller, a fourth optimized steering path to the second steering target using a 3DJ calculation if the third optimized steering path is determined to have a curvature greater than the maximum possible curvature; and driving the BHA along the fourth optimized steering path if the third optimized steering path is determined to be have a curvature greater than the maximum possible curvature.

The foregoing outlines features of several implementations so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the implementations introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. § 112(f) for any limitations of any of the claims herein, except for those in which the claim expressly uses the word "means" together with an associated function.

What is claimed is:

1. A drilling apparatus comprising:

a drill string comprising a plurality of tubulars;

a bottom hole assembly (BHA) disposed at a distal end of the drill string;

a controller in communication with the BHA, wherein the controller is configured to:

receive a drill plan;

identify a first steering target on the drill plan;

calculate a curvature limit of the BHA;

determine whether the BHA can be driven to the first steering target using one of a straight line projection or a rotary drilling projection;

calculate a first optimized steering path to the first steering target using a first *slide model* calculation based on achieving an inclination and azimuth vector at a vertical depth;

after calculating the first optimized steering path, calculate, using a second *slide model* calculation based on a single target point of the first a second steering target on the drill plan with an x, y, and z coordinate, a second optimized steering path to the first second steering target, wherein the second optimized steering path has a greater amount of curvature than the first optimized steering path[,] *;* after calculating the first and second optimized steering paths, calculate a third optimized steering path to a third steering target on the drill plan using the first *slide model* calculation based on achieving an inclination and azimuth vector at a vertical depth;

after calculating the third optimized steering path, calculate, using the second *slide model* calculation based on a single target point of a fourth steering target on the drill plan with an x, y, and z coordinate, a fourth optimized steering path to the fourth steering target, such that the controller alternates between the first and second *slide model* calculations; and determine a toolface angle and a distance to slide if the BHA cannot be driven to the first steering target using the one of the straight line projection or the rotary drilling projection; and a display device in communication with the controller, the display device configured to:

display the first optimized steering path and the first steering target along with the inclination and azimuth vector and vertical depth to an operator; and display the second optimized steering path and the second steering target along with the x, y, and z coordinates to the operator.

2. The drilling apparatus of claim 1, wherein the display device is configured to display the determined toolface angle and distance to slide to the operator.

3. The drilling apparatus of claim 1, further comprising a sensor system connected to the drill string and configured to detect one or more measurable parameters of the BHA, the one or more measurable parameters indicative of a position and an orientation of the BHA.

4. The drilling apparatus of claim 1, wherein the controller is further configured to determine the distance to slide using the calculated curvature limit.

5. The drilling apparatus of claim 1, wherein a distance between the first steering target and the BHA is between 200 and 300 feet.

6. A method of directing operation of a drilling system, comprising:

identifying, with a controller in communication with the drilling system, a first steering target;

calculating, with the controller, a curvature limit of a bottom hole assembly (BHA) of the drilling system;

determining, with the controller, whether the BHA can be driven to the first steering target using one of a straight line projection or a rotary drilling projection;

calculating, with the controller, a first optimized steering path to the first steering target using a first *slide model* calculation based on achieving an inclination and azimuth vector at a vertical depth;

displaying the first optimized steering path and the first steering target along with the inclination and azimuth vector at a vertical depth to an operator on a display device;

after calculating the first optimized steering path, calculating, with the controller, a second optimized steering path to a second steering target using a second *slide model* calculation based on a single target point of the second steering target with an x, y, and z coordinate, wherein the second optimized steering path has a greater amount of curvature than the first optimized steering path[,] *;* after calculating the first and second optimized steering paths, [calculate] *calculating* a third optimized steering path to a third steering target on a drill plan using the first *slide model* calculation based on achieving an inclination and azimuth vector at a vertical depth;

after calculating the third optimized steering path, [calculate] *calculating*, using the second *slide model* calculation based on a single target point of a fourth steering target on the drill plan with an x, y, and z coordinate, a fourth optimized steering path to the fourth steering target, such that the controller alternates between the first and second *slide model* calculations;

displaying the second optimized steering path along with the x, y, and z coordinates to the operator on the display device;

determining, with the controller, a toolface angle and a distance to slide;

displaying the toolface angle and the distance to slide to the operator on the display device; and driving the BHA to the first steering target using the straight line projection, the rotary drilling projection, or the determined toolface angle and distance to slide.

7. The method of claim 6, further comprising determining the distance to slide using the calculated curvature limit.

8. A method of directing operation of a drilling system, comprising:

identifying, with a controller in communication with the drilling system, a first steering target;

determining, with the controller, a maximum possible curvature of a bottom hole assembly (BHA) of the drilling system;

calculating, with the controller, a first optimized steering path to the first steering target using a first slide model calculation based on achieving an inclination and azimuth vector at a vertical depth;

displaying the first optimized steering path and the first steering target to an operator on a display device;

driving the BHA along the first optimized steering path if the first optimized steering path is determined to have a curvature less than the maximum possible curvature;

after calculating the first optimized steering path, calculating, with the controller, a second optimized steering path to a second steering target using a second slide model calculation different than the first slide model calculation, the second slide model calculation based on a single target point of the second steering target with an x, y, and z coordinate[,] ;

after calculating the first and second optimized steering paths, [calculate] *calculating* a third optimized steering path to a third steering target on a drill plan using the first *slide model* calculation based on achieving an inclination and azimuth vector at a vertical depth;

after calculating the third optimized steering path, [calculate] *calculating*, using the second *slide model* calculation based on a single target point of a fourth steering target on the drill plan with an x, y, and z coordinate, a fourth optimized steering path to the fourth steering target, such that the controller alternates between the first and second *slide model* calculations;

displaying the second optimized steering path to the operator on the display device; and driving the BHA along the second optimized steering path.

9. *A method of directing operation of a drilling system, comprising:*

*identifying, with a controller in communication with the drilling system, a first steering target;*

*determining, with the controller, a maximum possible curvature of a bottom hole assembly (BHA) of the drilling system;*

*calculating, with the controller, a first optimized steering path to the first steering target using a first slide model calculation based on achieving an inclination and azimuth vector at a vertical depth;*

*displaying the first optimized steering path and the first steering target to an operator on a display device;*

*then calculating, with the controller, a second optimized steering path to a second steering target using a second slide model calculation different than the first slide model calculation, the second slide model calculation based on a single target point of the second steering target with an x, y, and z coordinate;*

*then calculating, a third optimized steering path to a third steering target on a drill plan using the first slide model calculation based on achieving the inclination and azimuth vector at the vertical depth;*

*then calculating, using the second slide model calculation based on a single target point of a fourth steering target on the drill plan with another x, y, and z coordinate, a fourth optimized steering path to the fourth steering target;*

*displaying the second optimized steering path to the operator on the display device; and*

*driving the (BHA) along one of the first, second, third, or fourth optimized steering paths.*

*10. The method of claim 9, further comprising calculating, with the controller, a steering time associated with the each of the first, second, third, or fourth optimized steering paths.*

*11. The method of claim 10, further comprising selecting the one of the first, second, third, or fourth optimized steering paths based on a calculated minimum steering time.*

*12. The method of claim 9, further comprising calculating, with the controller, a steering effort associated with the each of the first, second, third, or fourth optimized steering paths.*

*13. The method of claim 12, further comprising selecting the one of the first, second, third, or fourth optimized steering paths based on a calculated minimum steering effort.*

*14. The method of claim 9, further comprising calculating, with the controller, a drilling efficiency associated with the each of the first, second, third, or fourth optimized steering paths.*

*15. The method of claim 13, further comprising selecting the one of the first, second, third, or fourth optimized steering paths based on a calculated maximum drilling efficiency.*

*16. The method of claim 15, further comprising displaying the selected one of the first, second, third, or fourth optimized steering paths, the first steering target, and the second steering target to the operator on the display device.*

*17. The method of claim 9, further comprising displaying each of the first, second, third, or fourth optimized steering paths to the operator on a single screen of the display device.*

*18. The method of claim 9, further comprising comparing each of the first, second, third, or fourth optimized steering paths to the determined maximum possible curvature of the BHA.*

*19. The method of claim 9, further comprising selecting the one of the first, second, third, or fourth optimized steering paths based on the optimized steering path falling within the determined maximum possible curvature of the BHA.*

*20. The method of claim 9, further comprising displaying each of the first, second, third, or fourth optimized steering paths along with the determined maximum possible curvature of the BHA to the operator on the display device.*

* * * * *